United States Patent [19]
Franz et al.

[11] 3,854,732
[45] Dec. 17, 1974

[54] SEALING ARRANGEMENT

[75] Inventors: Dietmar Franz, Lampertheim; Wilhelm Schmitt, Erbach, both of Germany

[73] Assignee: Carl Freudenberg Kommanditgesellschaft, Weinheim, Germany

[22] Filed: Jan. 11, 1972

[21] Appl. No.: 216,734

[30] Foreign Application Priority Data
Jan. 12, 1971  Germany.............................. 2101120
Jan. 19, 1971  Germany.............................. 2102348

[52] U.S. Cl. ................................ 277/58, 277/153
[51] Int. Cl. .............................................. F16j 15/32
[58] Field of Search .......... 277/9, 58, 134, 133, 59, 277/153; 214/.5

[56]  References Cited
UNITED STATES PATENTS
| | | | |
|---|---|---|---|
| 3,413,008 | 11/1968 | Greiner................................ | 277/58 |
| 3,501,155 | 3/1970 | Dega et al.............................. | 277/1 |
| 3,563,555 | 2/1971 | Koons................................... | 277/9 |
| 3,589,739 | 6/1971 | Scholten............................. | 277/134 |

*Primary Examiner*—Harry N. Haroian
*Assistant Examiner*—Robert I. Smith
*Attorney, Agent, or Firm*—Michael S. Striker

[57]  ABSTRACT

A propeller shaft sleeve surrounds a propeller shaft with clearance, the propeller shaft rotating in the sleeve. A sealing unit is accommodated in the space between the propeller and the sleeve to seal this space and includes an annular sealing member which engages with radially directed sealing edges the inside of the sleeve and the outside of the propeller shaft and one of whose axial ends is subject to higher and the other of whose ends is subjected to lower fluid pressure. A circumferentially extending contact face is provided on the sealing member at the other axial end thereof in the region of the sealing edge which engages the propeller shaft. The contact face is cylindrical or slightly conical and may be continuous or discontinuous, being in engagement with the propeller shaft via an interposed film of lubricating fluid.

8 Claims, 8 Drawing Figures

SEALING ARRANGEMENT

BACKGROUND OF THE INVENTION

The present invention is concerned with a sealing arrangement, and more particularly with a sealing arrangement having an annular sealing member which is to seal the clearance between an inner member and an outer member which surrounds the inner member, with one of these members rotating relative to the other.

Sealing arrangements of this general type are already known. They are, for instance, utilized as so-called shaft seals in which the sealing element engages the two concentric members with respective radially directed sealing edges. The pressure which acts in the clearance between the two members upon the sealing member is usually substantial, and in consequence the sealing edge is pressed under strong force against the rotating member so that it is subject to a high amount of wear. This problem is particularly bothersome on propeller shaft seals, that is on seals which seal the clearance between the propeller shaft of a marine vessel and the sleeve through which the propeller shaft extends from the interior to the exterior of the vessel. In particular this problem is disadvantageous if such sealing arrangements are used on vessels where the propeller shaft is relatively far submerged in water, for instance at depths of 12 meters or more. In this connection other disadvantages have been observed, namely for instance the fact that the sealing elements and any elastomeric suspending components which may also be part of the sealing arrangement and which are provided for suspending a floating ring, are subject to substantial wear due to the high pressures which exist and the relatively strong movements of the propeller shaft within the sleeve. The lip of the lip-type sealing ring which is usually used will harden relatively quickly and will become worn off, and its holding flange is often subject to very strong forces resulting from excessive stretching in radial direction. It has also been observed that the sealing lip may either be in engagement with the respective component at the wrong place or over a relatively broad area, with the result that the sealing arrangement becomes prematurely inoperative due to the high pressure loading resulting from water pressure or from the oil pressure of the lubricating oil. The configuration of the lip seal and/or the bellows which in the known arrangements is utilized for suspending the floating ring, is disadvantageous for the high loading which takes place as a result of pressure and/or shaft movements, as well as due to axial forces, so that lasting damage and breakage occur frequently.

Attempts have already been made in the prior art to rectify some of these problems. Thus, it is known to support portions of the sealing ring by a rigid component, for instance a sheet-metal component, which usually is of one piece with the ring and which extends to the vicinity of the lip of the lip-type sealing ring. However, this substantially limits the ability of the lip portion to move and difficulties can occur if the shaft should perform any significant movements within and with reference to its sleeve, so that this solution is by no means entirely satisfactory.

It is not believed necessary to discuss in detail the type of applications in which sealing arrangements according to the present invention can be utilized. However, by way of information it is pointed out that propeller shafts and sleeves for them in which sealing arrangements according to the present invention can be utilized, are known from and disclosed in German Pat. No. 858,371 to which reference may be had if necessary.

SUMMARY OF THE INVENTION

It is a general object of the present invention to provide an improved sealing arrangement of the type here under discussion.

More particularly it is an object of the present invention to provide such a sealing arrangement in which the sealing edge of the sealing member of annular configuration is at least partially relieved of the pressures acting upon it.

A concomitant object of the invention is to provide such a sealing arrangement in which wear upon the annular sealing member is substantially reduced.

Another object of the invention is to provide such a sealing arrangement whose life is increased and, if the sealing arrangement is used in a propeller shaft seal, wherein those rigid components which receive or serve for mounting of the annular sealing member can be retained even if the shaft or the bushing employed are turned as a result of wear, so that the diameter of the movable component —that is usually the shaft — which is to be sealed has become smaller than originally.

In pursuance of these and other objects of the invention one feature resides in a sealing arrangement which, briefly stated, comprises a first member and a second member surrounded by the first member. One of these members is rotatable relative to the other and the members are lubricated by a flow of lubricating fluid directed at their interface along the one member axially of the same. An annular sealing member is received between the first and second membes and has radially directed sealing edges which respectively engage the same. The sealing member has oppositely directed axial ends one of which is subject to higher and the other of which is subject to lower fluid pressure. A circumferentially extending contact face is provided on the sealing member at the other axial end in the region of one of the sealing edges and is at least approximately cylindrical in outline and in engagement with the one member via a film of the lubricating fluid.

The contact face may be circumferential continuous or circumferentially discontinuous. If the lubricating fluid is to be impelled by and in some circumstances to be caused to move under the contact face (to form the film of lubricating fluid), then the contact face may be provided with depressions or projections of any desired contour which may be chosen in dependence upon the type of lubricating fluid employed.

According to the invention it may be advantageous to provide additional sealing edges or sealing surfaces between the contact face and the sealing edge adjacent to which it is located, because in some circumstances the build-up of pressure in the lubricant forming the film beneath the contact face will be advantageously influenced by such a construction.

In some instances it may also be advantageous to provide several contact faces which are axially arrayed of the annular sealing member, all being in contact with the member which is to be sealed and some or all of which may be provided with depressions or recesses as before.

It may also be advantageous to provide special components which are provided on or in the inner circumferential surface of the annular sealing member and having surfaces or surface portions which contact the member being sealed via an intermediate film of lubricant. These components are preferably made of a material which is different from the material of the annular sealing member, for instance a material having a lower coefficient of friction and a higher resistance to wear than the elastomeric material of which the annular sealing member itself is made. For instance, polyamides can be used for this purpose. These components may for instance be in the form of studs or pins which are inserted into holes provided for this purpose, or which are "buttoned" into such holes if the hole is provided of undercut configuration and the stud is of mating configuration.

The spacing of the contact face from the surface of the member being sealed, that is for instance the propeller shaft, can be determined empirically or by calculation, taking into consideration theoretical and practical requirements relating to the hydrodynamic circumstances of slide bearing and considering special circumstances, such as the relatively small width of the supported contact face of the annular sealing member. Such empirical or theoretical determination can be made by persons of ordinary skill in the art without difficulty.

The considerations and structural features of the present invention can of course be utilized in a sealing arrangement having a plurality of annular sealing members even if only one of them is configured in accordance with the present invention.

In order to be able to utilize the rigid mounting components which may be present in such a sealing arrangement, even if the diameter of the shaft or other component being sealed has become smaller than previously, or to permit the utilization of an annular sealing member having a smaller inner and outer diameter than the one previously used, the annular sealing member is provided in the cross-section of the connecting portion between the area where the annular sealing element is held by a rigid component at its outer edge and the adjacent contact face with two recesses which act in effect as pivots or hinges. Thus, an accommodation is possible without having to change the rigid components if the holding flange of the annular sealing element—seen in cross-section—is so configured that its limiting surfaces extending transversely to the component being sealed will diverge outwardly away from this component. The components which serve for engaging and holding this flange, namely a stationary component and a movable component which is movable axially of the member being sealed and which can be fixed at a freely selectable spacing from the stationary component, have contact faces which correspond to the surfaces of the flange. After the component being sealed has been turned, whereby its diameter is reduced, the movable component is withdrawn axially of the stationary component to such an extent that the flange of the annular sealing member can be secured between them on an annulus the outer radius of which is closer to the component being sealed than was the case before the diameter of this component was reduced due to turning thereof. It is advantageous to provide disk members which aid in effecting the axial spacing between the stationary and movable components for mounting the flange of the annulus sealing member, as will be discussed later.

In some circumstances it may be advantageous to provide several contact faces which are arranged axially and which may be provided with depressions or recesses for the reasons discussed earlier.

If a propeller shaft seal is involved, having a floatingly mounted ring to which the annular sealing member or members is connected, then the connecting bellows is, according to the present invention, delimited between the rigid outer and inner mounting components provided for it by arcuate portions or otherwise similarly curved lines which, as seen in cross section, are substantially evenly spaced from one another. This cross-sectional configuration facilitates an accommodation of the suspended components to movements of the propeller shaft, and the danger is reduced that forces acting upon the bellows might result in permanent damage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
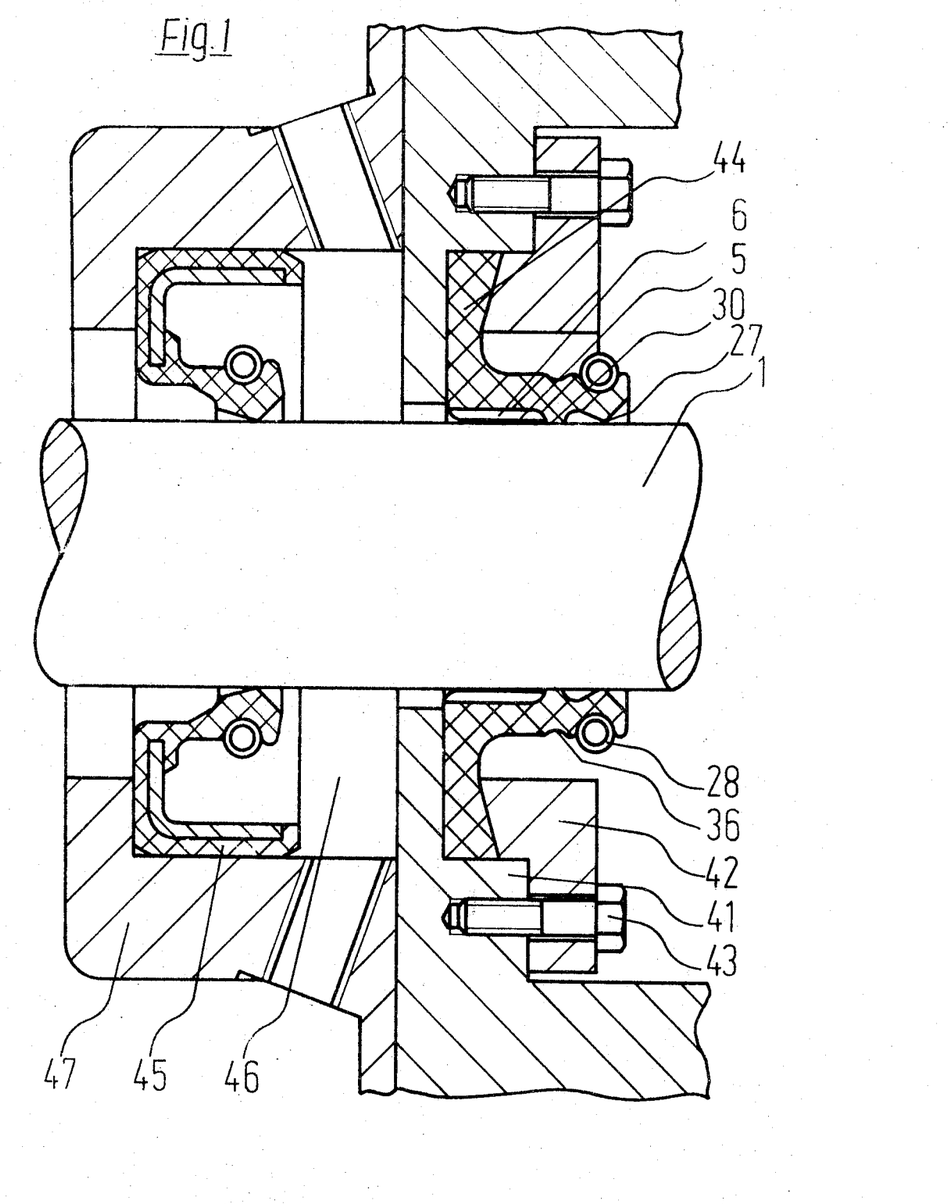
FIG. 1 is an axial section illustrating an embodiment of the invention.

Discussing now the drawing in detail, and firstly FIG. 1, it will be seen that the illustrated annular sealing member has a flange portion 44 for mounting, which is pressed at the non-pressure or lower-pressure side against the housing by means of the clamping element 42 and the mounting screw 43, relatively close to the shaft 1 to be sealed, in order to support the flange portion on the seal.

The sealing edge 27 is subjected to a pressure by a helical spring 28 which may, however, be omitted. Recess 36 adjacent the space for the spring 28 between the same and the flange 44 provides better capability of movement for the sealing member, a capability of movement which due to the relatively substantial cross section of the sealing member would otherwise not be as good.

A contact face 5 is provided which is located at a small distance from the shaft 1, so that a film of lubricating fluid can form between the surface of the shaft 1 and the contact face 5, with this film of lubricating fluid supporting the contact face 5 or the membrane portion of the annular sealing member intermediate the flange 44 and the sealing lip part. Reference numeral 6 designates a recess in the contact face 5, so that the contact face 5 is not circumferentially continuous as is also evident in FIG. 2. Reference numeral 47 designates the housing and by the aid of the radial sealing ring 45 the lubricant space 46 is connected with the pressureless side or the side of lower pressure of the shaft sealing ring.

Figure 2:
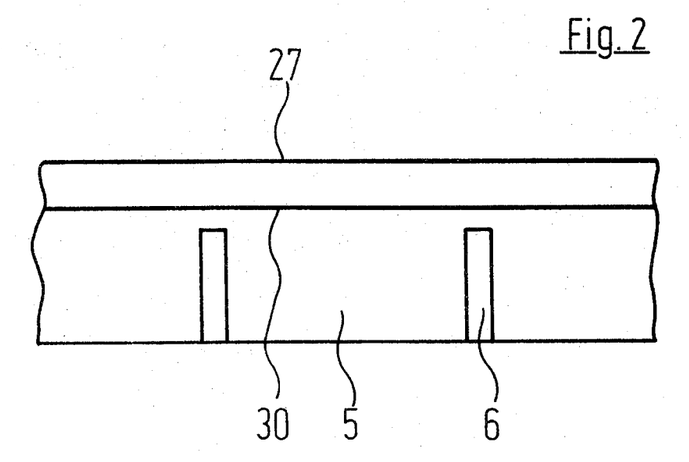
FIG. 2 is a fragmentary developed view of an inner circumferential surface of an annular sealing member according to the invention.

FIG. 2 is a portion showing in developed view the inner circumferential surface of the sealing ring. It illustrates the sealing edge 27 and the additional sealing edge 30. The contact face 5 which is supported on the lubricating fluid film, is provided with the recesses or grooves 6 so that it is in part interrupted in circumferential direction.

Figure 3:
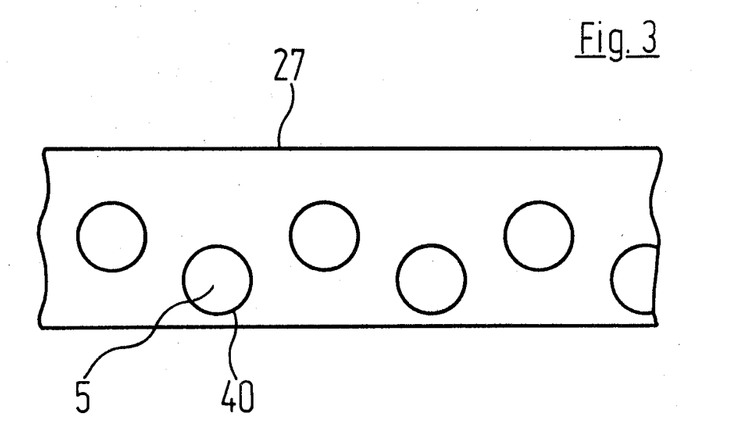
FIG. 3 is a view similar to FIG. 2 but illustrating a further embodiment of the invention.
Figure 4:
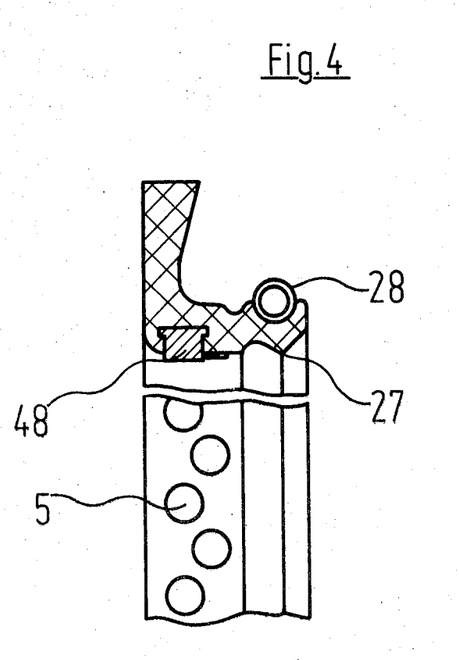
FIG. 4 is a fragmentary axial section illustrating an additional embodiment of the invention.

In the embodiment of FIG. 3, a view which is analogous to that of FIG. 2, we have illustrated the possibility that the contact face 5 may be composed of several sections delimited by circular edge portions 40. FIG. 4 shows that the inner circumferential surface of the shaft sealing member or ring may be provided with sections 48 which may be applied after the shaft sealing member is produced by vulcanization. The sections 48 are advantageously of a material having a lower coefficient of friction and a higher resistance to wear than the material of which the shaft sealing ring itself is made. The sections 48 are in the embodiment of FIG. 4 received in recesses (one of each shown) which are undercut so that they can be snapped into these recesses. However, they can also be friction fitted into appropriately configurated recesses, or be adhesively retained therein.

Figure 5:
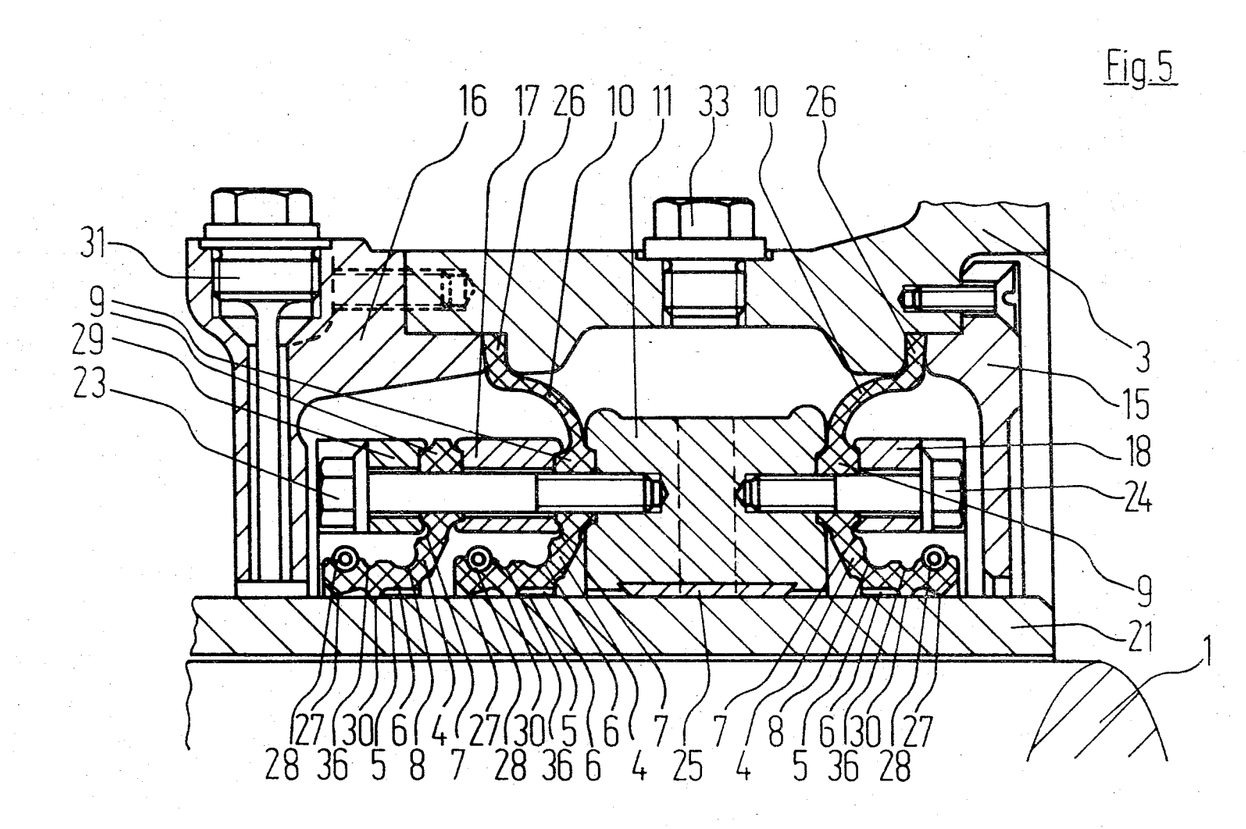
FIG. 5 is a fragmentary axial section illustrating the rear portion of a propeller shaft seal with floating ring.
Figure 6:
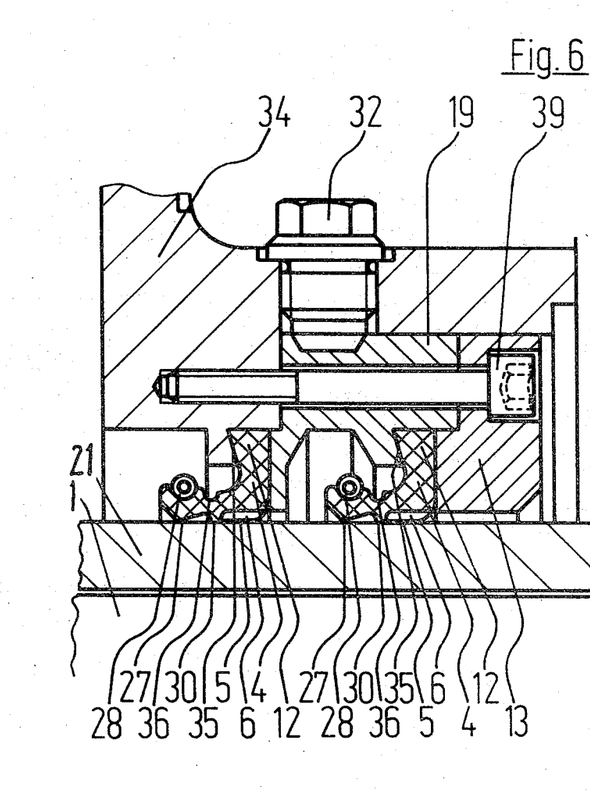
FIG. 6 illustrates an embodiment of a propeller shaft seal wherein the sleeve being sealed has its original diameter.
Figure 7:
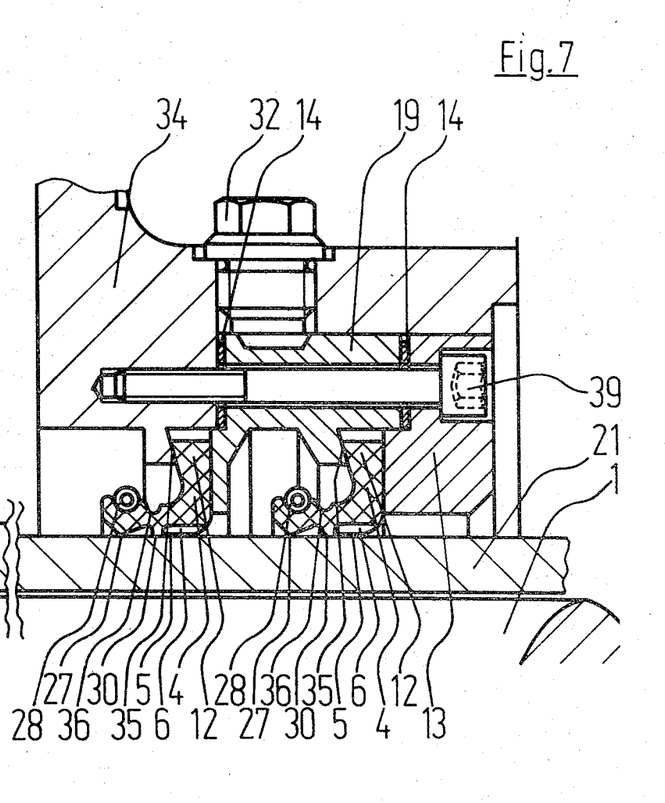
FIG. 7 illustrates the embodiment of FIG. 6 after the diameter of the sleeve being sealed has decreased due to turning.

The embodiment in FIGS. 5–7 show the invention utilized in a propeller shaft seal for a marine vessel. Here the propeller shaft is again designated with reference numeral 1 and is surrounded by a bushing 21 which in turn is surrounded by the housing of the sealing unit for the propeller shaft. In the space defined by these components there are located four lip-type sealing members 4. Two of these are directly connected with the floating ring 11 by means of holding elements 17 and 18 as well as screws 23 and 24. The ring 11 is supported on the bushing 21 via the surface 25.

At the side of the ring 11 which is to the left in FIG. 5 there is provided an additional sealing member 4 which is indirectly connected with the ring 11 via the element 29 and the screw 23 which connected with the holding element 18 of the adjacent sealing member 4. In this embodiment the two bellows which serve for mounting the ring 11 are each of one piece with one of the two sealing members 4, in such a manner that for the bellows 10 the flange 9 is the inner mounting component, and for the sealing member 4 the outer mounting component.

Seen in cross-section the bellows 10 are delimited by circular arcs and at their outer ends they merge into the flanges 26 which are retained between shoulders on the housing 3 and the covers 15 and 16, respectively. Tests have shown that such a cross-sectional configuration significantly increases the lifetime of the bellows 10 for the floatingly mounted ring 11.

The sealing portion of the lip-type sealing member 4 is provided behind the edge 27 with an annular bead 30 as also shown in FIG. 2. Adjacent the bead 30 is the contact face 5 which is supported on the outer circumferential surface of the bushing 21 via an interposed film of lubricating fluid. The contact face 5 is cylindrical in its contour in this embodiment, and has a certain spacing from the surface of the bushing 21. However, it can also be slightly conical. It is emphasized that it is not necessary that the contact face 5 will extend continuously and without interruption over the entire circumference of the bushing 21; it may be sufficient if it is in form of several surface portions which are distributed over the circumference with spacing from one another.

The purpose of the contact face 5 is to assure pressure relief for the sealing edge 27. To guarantee that such pressure relief continues to be provided even in the event of a shifting of the securing line in radial direction, two recesses are provided in the connecting portion of which that which is located at a greater radial distance from the shaft 1 is designated with 7, whereas the other recess closer to the shaft 1 is designated with reference numeral 8. If, now, a material removal from the bushing 21 becomes necessary by turning, that is for repair purposes, with a resultant decrease of the other diameter of the bushing 21, the lip portion of the sealing member 4 will so shift with reference to the axis of the bushing 21 that its new position is parallel to its original position because the two recesses 7 and 8 act in effect as pivots or hinges. If only one of these recesses 7 or 8 were present, then an inclination skewed to the axis of the bushing would occur and the contact face 5 would lift off the surface of the bushing 21, which is undesirable. By resort to the present invention it is thus possible to install new sealing members with the same nominal dimensions as before, even though the outer diameter of the bushing 21 is smaller than before, as long as this decrease in the outer diameter has not been sufficient to permit installation of a sealing member with the next-smaller nominal dimensions.

The sealing edge 27 is loaded under pressure by a helical spring 28 which may, however, be omitted. The recess 36 affords better possibility of movement for the portion having the sealing edge 27, for the reasons which have been outlined earlier. Reference numeral 33 designates a screw closing the opening for admission of lubricant fluid and reference numeral 31 designates a device for measuring the proper rotation of the shaft. The inner circumferential surface of the sealing member may be configurated in accordance with the embodiments of FIGS. 2 and 3.

In FIGS. 6 and 7 we have illustrated an embodiment in which the recesses 7 and 8 of FIG. 5 have been omitted. Here, an accommodation to a reduced outer diameter of the seleve 21 is achieved by a novel mounting of the flanges 12 of the sealing members 4. In cross-section the flange 12 is delimited at one side and transversely to the shaft 1 by a conical surface which contacts a correspondingly configurated surface 36 on the mounting portion 34. At the other side the flange 12 is delimited by an arcuate surface which is normal to the shaft 1 but which may also instead be of conical configuration. In both instances it must be kept in mind that these surfaces which delimit the flange 12 must diverge outwardly away from the shaft 1, because with such a configuration it is possible to displace the rigid mounting component 13 with reference to a stationary mounting component, for instance the component 11, to thereby so change the annular gap which tapers in direction towards the shaft, and in which the flange 12 is to be retained, that the desired radial spacing of the flange can be selected. The radial spacing of the mounting components, and thereby the width of the tapering annular gap, can be adjusted in a simple manner by the use of annular shims 14.

An axially displaceable mounting component 19 is provided for the two sealing members 4, and on the one hand supports the flange surface which faces a one direction away from the lip, whereas on the other hand it supports the flange surface of the adjacent sealing member 4 which faces towards the lip. The screw 39 connects the mounting component 19 releasably.

Figure 8:
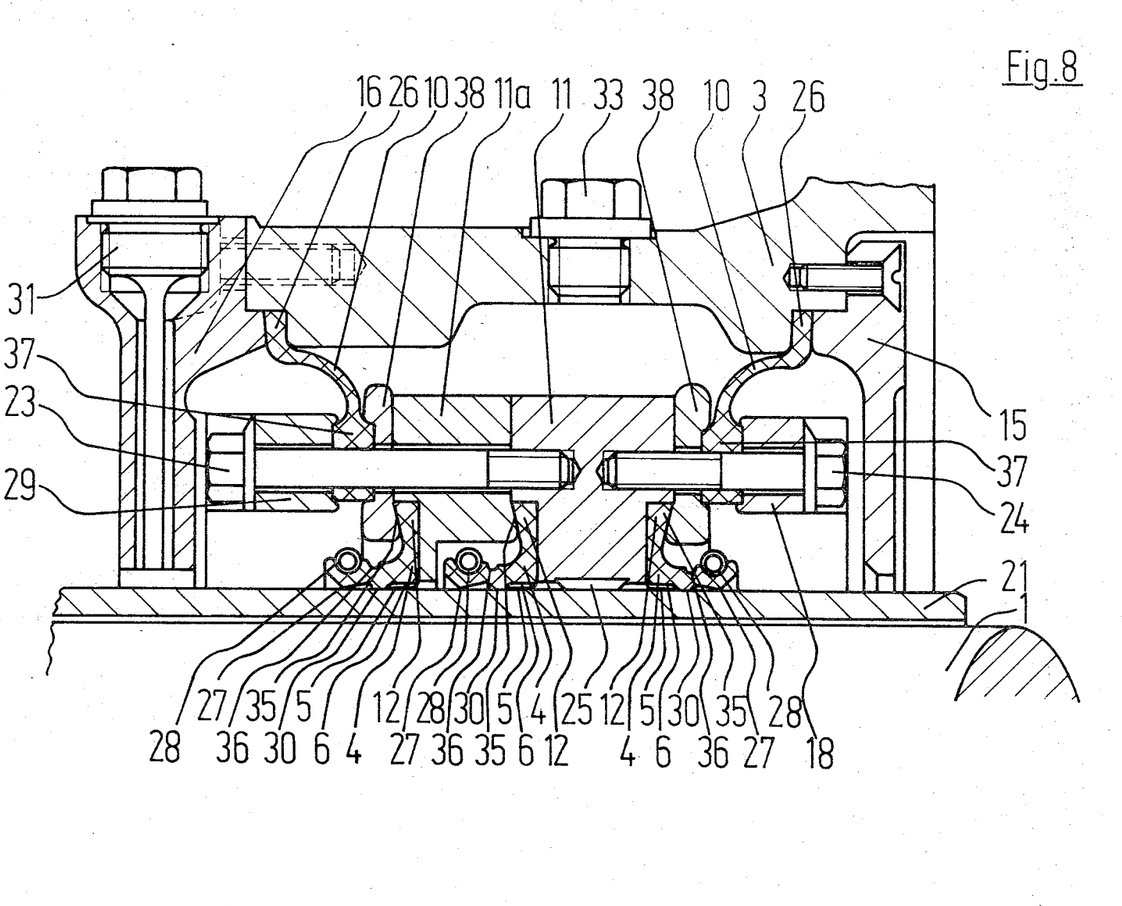
FIG. 8 is a view analogous to FIG. 5 illustrating a further embodiment of the invention.

Coming, finally, to the embodiment illustrated in FIG. 8 it will be seen that here the bellows 10 on which the floatingly mounted ring 11 is suspended, do not form one part with the adjacent sealing members 4. This makes it possible to utilize for the sealing members 4 a different material than for the bellows 10, so that the material for the sealing members 4 can be freely selected, taking into consideration the requirements which are made of the particular sealing members in the particular sealing construction.

For further details concerning the use of shaft seals on marine vessels, as well as terminology concerning the components, reference may also be had to Naval Personnel Training Course NAVPERS 10524–C, issued by the Bureau of Naval Personnel, United States Navy.

It will be understood that each of the elements described above, or two or more together, may also find a useful application in other types of constructions differing from the types described above.

While the invention has been illustrated and described as embodied in a sealing arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A sealing arrangement comprising, in combination, a first member, and a second member surrounded by said first member, one of said members being rotatable relative to the other and said members being lubricated by a flow of lubricating fluid directed at their interface along said one member axially of the same; at least one annular sealing member received between said first and second members and having radially directed sealing edges respectively engaging the same, said sealing member also having oppositely directed axial ends one of which is subject to higher and the other of which is subject to lower ambient fluid pressure, and a circumferential surface provided with engaging portions of a material having low coefficient of friction and high resistance to wear; and a circumferentially extending contact face provided on said circumferential surface of said sealing member at said other axial end in the region of one of said sealing edges, said contact face being of at least approximately cylindrical outline and being in engagement with said one member via an interposed film of said lubricating fluid.

2. A sealing arrangement as defined in claim 1, wherein said material of said engaging portion is polyamide.

3. A sealing arrangement as defined in claim 1, wherein said one member is a ship's propeller shaft and the other of said first and second members is a propeller shaft sleeve surrounding said propeller shaft; and further comprising additional ones of said sealing members interposed between said first and second members.

4. A sealing arrangement as defined in claim 3, wherein said sealing members are lip seals having mounting flanges; and wherein the mounting flange of at least one of said lip seals has flange surfaces extending transversely to said axis of rotation and diverging in radially outward direction.

5. A sealing arrangement as defined in claim 4; further comprising flange mounting means for said one lip seal, including a stationary component and a movable component slidable axially of said first and second members and being arrestable at a selectable axial distance from said first component, said mounting means having abutment surfaces corresponding to said flange surfaces.

6. A sealing arrangement as defined in claim 5; and further comprising spacer disks interposable between said first and second components.

7. A sealing arrangement as defined in claim 3, said sealing members having respective radially outer regions, and wherein at least one of said sealing members includes two recesses intermediate its radially outer region and an adjacent contact face proximal to said radially outer region.

8. A sealing arrangement comprising, in combination, a first member, and a second member surrounded by said first member, one of said members being rotatable relative to the other and said members being lubricated by a flow of lubricating fluid directed at their interface along said one member axially of the same; at least one annular sealing member received between said first and second members and having radially directed sealing edges respectively engaging the same, said sealing member having oppositely directed axial ends one of which is subject to higher and the other of which is subject to lower ambient fluid pressure; a circumferentially extending contact face provided on said sealing member at said other axial end in the region of one of said sealing edges, said contact face being of at least approximately cylindrical outline and being in engagement with said one member via an interposed film of said lubricating fluid; and a mounting element having rigid inner and outer sections and being delimited in cross-sectional view by surfaces having substantially uniformly spaced curved contour lines.

* * * * *